United States Patent
Mach et al.

(10) Patent No.: US 8,825,052 B2
(45) Date of Patent: Sep. 2, 2014

(54) PROVIDING A MOBILITY STATE FOR A MOBILE DEVICE

(75) Inventors: Tomasz Henryk Mach, Fleet (GB); Andrew John Farnsworth, Bromsgrove (GB); Gordon Peter Young, Shipston-on-Stour (GB); Raghavendra Magadi Rangaiah, West Bromwich (GB); Richard Charles Burbidge, Hook (GB)

(73) Assignee: Blackberry Limited, Waterloo, Ontario (CA)

( * ) Notice: Subject to any disclaimer, the term of this patent is extended or adjusted under 35 U.S.C. 154(b) by 182 days.

(21) Appl. No.: 13/245,969

(22) Filed: Sep. 27, 2011

(65) Prior Publication Data

US 2013/0079017 A1    Mar. 28, 2013

(51) Int. Cl.
*H04W 36/00* (2009.01)
*H04W 36/32* (2009.01)
*H04W 36/14* (2009.01)

(52) U.S. Cl.
CPC .......... *H04W 36/0083* (2013.01); *H04W 36/32* (2013.01); *H04W 36/14* (2013.01)
USPC ........................................................ 455/436

(58) Field of Classification Search
USPC ........................ 455/436–442, 426.1, 432.1, 455/435.1–435.3; 370/331
See application file for complete search history.

(56) References Cited

U.S. PATENT DOCUMENTS

| | | | |
|---|---|---|---|
| 2008/0167042 A1* | 7/2008 | Kitazoe | 455/436 |
| 2008/0233958 A1* | 9/2008 | Robbins et al. | 455/436 |
| 2009/0239535 A1* | 9/2009 | Chun et al. | 455/435.2 |
| 2010/0075716 A1 | 3/2010 | Chang | |
| 2010/0093350 A1* | 4/2010 | Wang et al. | 455/436 |
| 2011/0045833 A1* | 2/2011 | Kazmi | 455/436 |
| 2011/0206003 A1* | 8/2011 | Wu | 370/331 |
| 2012/0064896 A1* | 3/2012 | Guo et al. | 455/436 |
| 2013/0109381 A1* | 5/2013 | Takahashi et al. | 455/435.1 |

FOREIGN PATENT DOCUMENTS

| | | |
|---|---|---|
| WO | 2008040962 A1 | 4/2008 |
| WO | 2010017012 A1 | 2/2010 |
| WO | 2011013967 A2 | 2/2011 |

OTHER PUBLICATIONS

Canadian Intellectual Property Office, International Search Report and Written Opinion for Appl. No. PCT/CA2012/050271, dated Jul. 3, 2012, 10 pages.

3GPP TS 36.331 V10.2.0 (Jun. 2011) Technical Specification 3rd Generation Partnership Project; Technical Specification Group Radio Access Network; Evolved Universal Terrestrial Radio Access (E-UTRA); Radio Resource Control (RRC); Protocol specification (Release 10) (290 pages).

3rd Generation Partnership Project—3GPP TS 25.301, V10.0.0—Radio Interface Protocol Architecture Release 10, Mar. 2011 (53 pages).

(Continued)

*Primary Examiner* — Brandon Miller

(74) *Attorney, Agent, or Firm* — Trop Pruner & Hu P.C.

(57) ABSTRACT

In response to a transition of a mobile device from a first wireless access network to a second wireless access network, a mapping is applied to obtain a particular mobility state of the mobile device to use in the second wireless access network, where the mapping outputs the particular mobility state in response to information associated with mobility of the mobile device in the first wireless access network.

22 Claims, 6 Drawing Sheets

(56) References Cited

OTHER PUBLICATIONS

3rd Generation Partnership Project—3GPP TS 25.304, V10.1.0—User Equipment (UE) Procedures in Idle Mode and Procedures for Cell Reselection in Connected Mode—Release 10, Jun. 2011 (52 pages).

3rd Generation Partnership Project—3GPP TS 36.304, V10.2.0—Evolved Universal Terrestrial Radio Access (E-UTRA); User Equipment (UE) Procedures in Idle Mode—Release 10, Jun. 2011 (36 pages).

3rd Generation Partnership Project—3GPP TS 25.331, V5.24.0—Radio Resource Control (RRC); Protocol Specification—Release 5, Jun. 2009 (1046 pages).

* cited by examiner

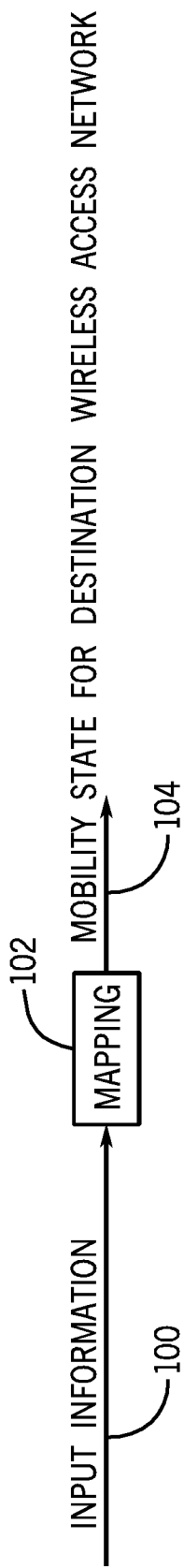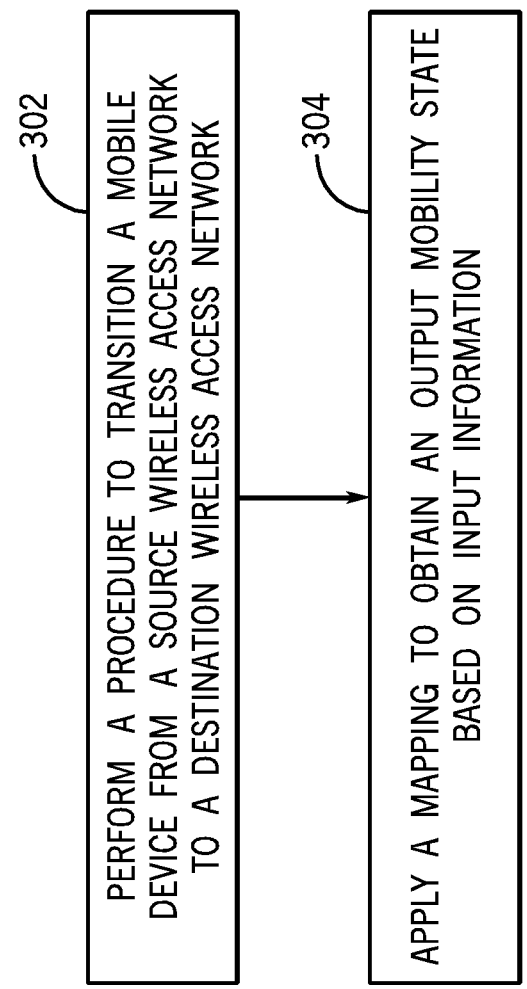

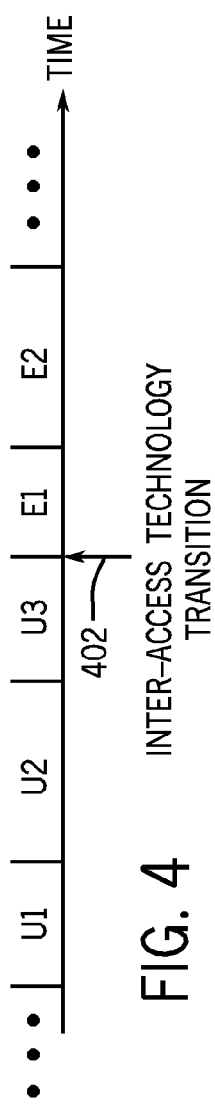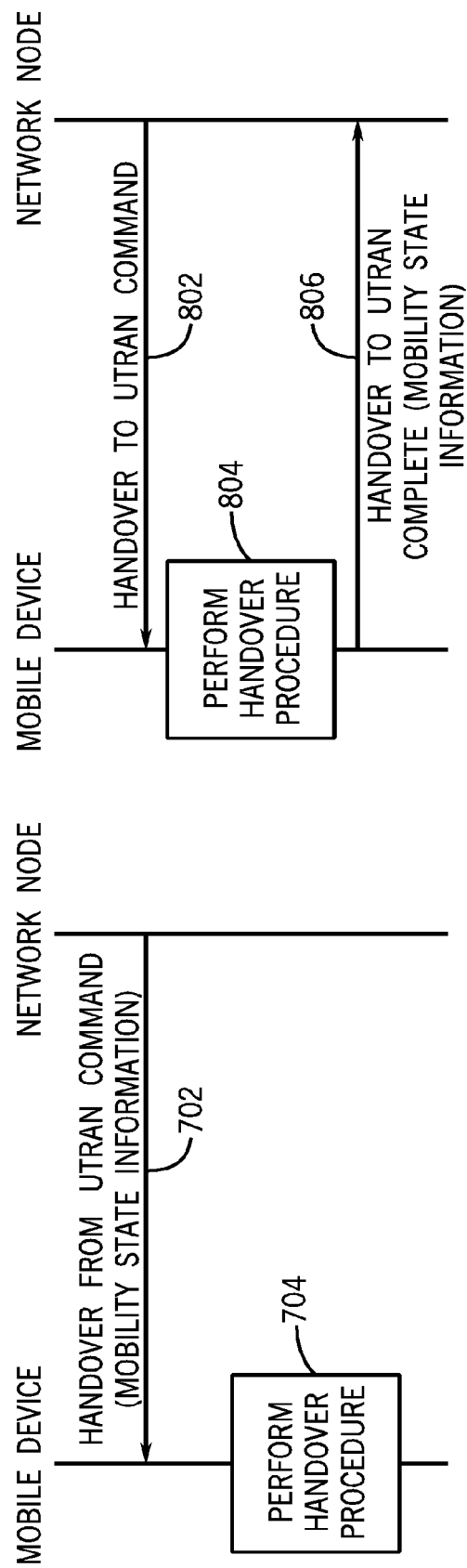

PROVIDING A MOBILITY STATE FOR A MOBILE DEVICE

BACKGROUND

A mobile device is able to connect to a wireless access network to perform various different types of communications, such as to establish a call with another endpoint, to access websites, to perform text messaging, and so forth. In some cases, a mobile device is able to transition between different types of wireless access networks according to different access technologies. The transition between different types of wireless access networks can be performed for various reasons, such as due to movement of the mobile device between different geographic points, due to detection of stronger signaling in one of the wireless access networks, or for other reasons.

BRIEF DESCRIPTION OF THE DRAWINGS

Some embodiments are described with respect to the following figures:

FIG. 1 is a schematic diagram of applying a mapping to obtain a mobility state for a mobile device, in accordance with some implementations;

FIG. 3 is a flow diagram of a process of performing transitioning between different wireless access networks, according to some implementations;

FIG. 4 is a timing diagram of cell changes performed by a mobile device in different wireless access networks, according to some examples;

FIGS. 7 and 8 are flow diagrams of communicating mobility state information between different devices, according to some implementations;

DETAILED DESCRIPTION

Figure 2:
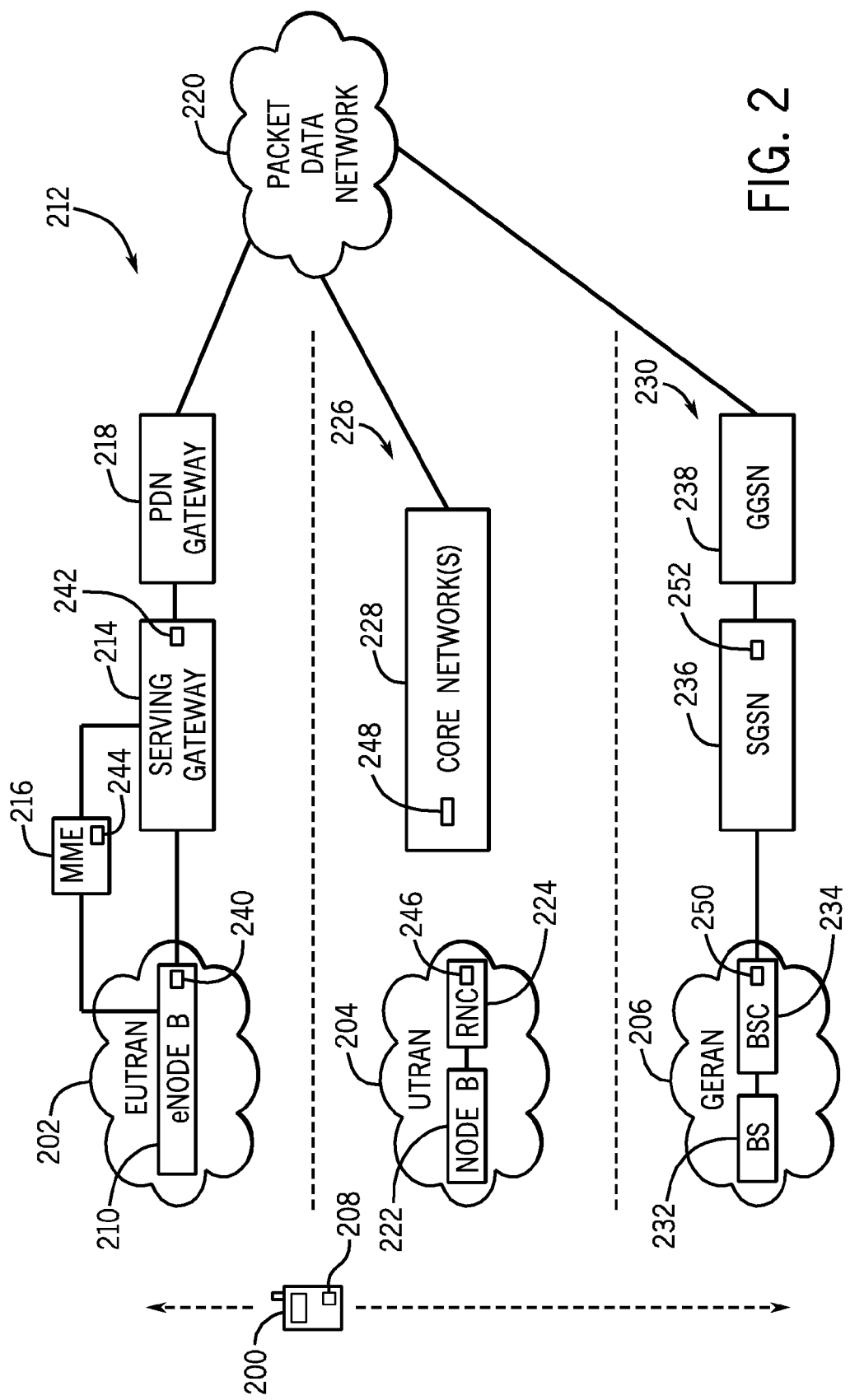
FIG. 2 is a block diagram of an example arrangement that includes mobile communications networks, in accordance with some implementations.

Various wireless access technologies have been proposed or implemented to enable mobile devices (e.g. computers, personal digital assistants, smartphones, cellular phones, game devices, etc.) to perform communications with other endpoints. Examples of wireless access technologies include GSM (Global System for Mobile communications) and UMTS (Universal Mobile Telecommunications System) technologies, which are defined by the Third Generation Partnership Project (3GPP). Enhancements to the UMTS technology are provided by Long Term Evolution (LTE) standards from 3GPP. The LTE standards include the initial LTE standard as well as the LTE-Advanced standard. The LTE standards are also referred to as the EUTRA (Evolved Universal Terrestrial Radio Access) standards.

In addition to the foregoing wireless access technologies, other example wireless access technologies include the CDMA 2000 (Code Division Multiple Access 2000) technology, as defined by 3GPP2; the WiMAX (Worldwide Interoperability for Microwave Access) technology, as defined by IEEE 802.16; or others.

A mobile device can encounter coverage areas of different wireless access networks. A coverage area of a particular wireless access network includes an arrangement of cells, where each cell refers to a specific region within the coverage area that includes network wireless equipment (e.g. a base station) that is able to wirelessly communicate with mobile devices in the cell. As used here, "cell" can refer to an entire cell (which can have multiple sectors), or a given cell sector, or any other segment of an entire cell.

In some examples, a mobile device can encounter a coverage area of a UMTS access network and a coverage area of an EUTRA network. A UMTS access network is often referred to as a UTRAN (Universal Terrestrial Radio Access Network), which includes base stations (also referred to as Node Bs) and corresponding radio network controllers (which can perform radio resource management tasks, mobility management tasks, and so forth). An EUTRAN (EUTRA network) includes evolved node Bs (eNode Bs)—eNode Bs include functionalities of base stations as well as certain functionalities of radio network controllers.

The mobile device can also encounter coverage areas of other access technologies, including a GSM access technology, WiMAX access technology, and so forth.

Based on predefined criteria, a mobile device can be configured to transition between wireless access networks of different access technologies. A transition between wireless access networks refers to a transition between a cell of a source wireless access network and a cell of a destination wireless access network. A "transition" between cells can refer to cell reselection or handover. Cell reselection is often performed when a mobile device is in idle mode, a mode in which the mobile device is not assigned a dedicated channel, but is listening to broadcast channels to listen for system information, including a paging message for determining whether the mobile device is being paged for a call. Handover is performed when a mobile device is in connected mode (also referred to as "active mode" or "dedicated mode"), a mode in which the mobile device may be assigned a dedicated channel to communicate information with the network. Note that certain standards may also refer to performing cell reselection when the mobile device is in connected mode.

In some examples, the mobile device can transition between a UTRAN and an EUTRAN, or alternatively, the mobile device can transition between a GERAN (GSM/EDGE Radio Access Network) and a UTRAN or EUTRAN. "GSM/EDGE" refers to GSM/Enhanced Data rates for GSM Evolution, and is defined by 3GPP standards. Alternatively, it may be possible for the mobile device to transition between a WiMAX access network and a UTRAN or EUTRAN. Transitions between other combinations of wireless access networks are also possible.

Certain access technologies, such as UMTS or EUTRA, define mobility states for a mobile device. A "mobility state" of a mobile device indicates a cell change rate of the mobile device. The cell change rate refers to a rate at which the mobile device is transitioning between different cells (cells within the same wireless access network or cells of different wireless access networks). Different types of wireless access networks can provide different sets of mobility states. For example, a UTRAN provides a "normal" mobility state and a "high" mobility state, whereas an EUTRAN provides a "normal" mobility state, a "medium" mobility state, and a "high" mobility state.

As a result of different sets of mobility states provided by different wireless access networks, mismatches in mobility states can occur when a mobile device transitions between the different wireless access networks. For example, if the mobile device is in the "medium" mobility state while connected to the EUTRAN, there is no corresponding mobility state after the mobile device transitions to the UTRAN, since the UTRAN has just the "normal" and "high" mobility states. As a result of the mismatch, the mobile device can be in a suboptimal mobility state after the mobile device transitions between the different wireless access networks, which can result in degraded mobile device performance.

Defining different mobility states for a mobile device allows a wireless access network to improve mobility performance of the mobile device by adjusting configuration parameters for the mobile device during operation. A "high" mobility state indicates that the mobile device is transitioning between cells at a relatively rapid rate (which can indicate that the mobile device is a fast-moving mobile device, for example). A "normal" mobility state indicates that the mobile device is transitioning between cells at a relatively slower rate (which can indicate that the mobile device is a slow-moving mobile device, for example). A "medium" mobility state indicates that the mobile device is transitioning between cells at a rate between a relatively fast rapid rate and a relatively slower rate. Although reference is made to a mobility state of the mobile device being based on the rate of transitions between cells in some implementations, it is noted that in other implementations, the mobility state of the mobile device can be based on other indications of mobility of the mobile device, such as the mobile device's velocity. For example, a mobile device that is configured with a GPS (Global Positioning System) receiver can measure its velocity. Such velocity can be mapped to a corresponding mobility state.

In some examples, to determine the mobility state of the mobile device, a number of cell changes (transitions between cells) within a predefined time interval, Tcrmax, is determined. The number of cell changes within time interval Tcrmax is represented as Ncr. The number of cell changes can include cell reselections or handovers, whether within the same access technology or between different access technologies. The current 3GPP standard defines the mobility state within one wireless access technology without considering cell changes between different wireless access technologies. If Ncr exceeds a predetermined threshold, then the mobility state of the mobile device is set as a "high" mobility state; otherwise, the mobility state is set as a "normal" mobility state. In a wireless access network that also includes the "medium" mobility state, multiple thresholds can be defined to classify the mobile device into one of the more than two candidate mobility states.

A configuration parameter for the mobile device that can be adjusted based on its mobility state includes a configuration parameter related to transitions between different cells. In some examples, if the mobility state of the mobile device is a "high" mobility state, then a shorter cell reselection timer (also referred to as Treselection timer in a UTRAN or EUTRAN) can be set. The Treselection timer controls how long evaluation of whether the mobile device is to be transitioned between cells is performed—evaluation of whether the mobile device is to be transitioned between cells is performed faster with a shorter Treselection timer. The adjustment of the cell reselection timer is referred to as speed-dependent scaling of the cell reselection timer.

Also, to reduce the overall number of cell changes, another configuration parameter of the mobile device that can be adjusted is one that indicates whether the mobile device is to be biased towards larger or smaller cells. A mobile device having a "high" mobility state can be biased towards larger cells (with larger wireless coverage regions so that the mobile device can remain in the larger cells for a longer period of time). On the other hand, a mobile device having a "normal" mobility state can be biased towards smaller cells, since smaller cells tend to have improved wireless coverage qualities resulting in better user experience. The ability to bias mobile devices to cells of different sizes in a coverage area allows for better load balancing performance. An example of an arrangement that includes larger cells and smaller cells is an arrangement having a hierarchical cell structure, which includes macro cells (larger cells) and micro or pico cells (smaller cells).

If, after a transition between different wireless access networks, the mobility state of a mobile device is not classified correctly, then configuration parameters for the mobile device may not be set properly. For example, a fast-moving mobile device may be classified in the "normal" mobility state, which can cause the Treselection timer to be set to too large a value for the mobile device, or can cause the mobile device to be biased towards smaller cells rather than larger cells.

In accordance with some embodiments, as shown in FIG. 1, a mapping 102 can be provided to produce, based on input information 100, a mobility state 104 of a mobile device to use in a destination wireless access network, in response to transition of the mobile device from a source wireless access network to the destination wireless access network. The source wireless access network is according to a first wireless access technology, while the destination wireless access network is according to a second, different wireless access technology.

The mapping 102 can be a mapping data structure (such as a mapping table or other data structure) to correlate a first collection of mobility states provided by the first wireless access technology to a second collection of mobility states provided by the second wireless access technology. The mapping data structure has entries each associating a corresponding mobility state from the first collection network with a respective mobility state from the second collection. Such mapping data structure can be considered to provide a static mapping of the first collection of mobility states to the second collection of mobility states.

In response to transition of the mobile device between wireless access networks of different access technologies (from the source wireless access network to the destination wireless access network), the mapping 102 can be applied, where the input information 100 is the mobility state of the mobile device when the mobile device was connected to the source wireless access network. The mobility state of the mobile device in the source wireless access network is used to select an entry from the mapping data structure to obtain the corresponding mobility state (104) to use in the destination wireless access network.

Alternatively, the mapping 102 can be in the form of a function that outputs the mobility state 104 for the destination wireless access network based on input information 100 that includes a cell change rate of the mobile device in the source wireless access network, according to some examples. Such function provides dynamic mapping to a mobility state to be used in the destination wireless access network. Further details regarding the function are discussed further below.

In either of the implementations discussed above, note that the input information 100 indicates the mobility of the mobile device in the source wireless access network.

In some scenarios, both the first and second wireless access technologies (associated with respective source and destination wireless access networks, e.g. UTRAN and EUTRAN) are associated with corresponding collections of mobility states. In other scenarios, a mobile device can transition from a source wireless access network that does not define mobility states (such as a GERAN) to a destination wireless access network that does define mobility states (such as UTRAN or EUTRAN). In such latter scenarios, techniques or mechanisms according to some embodiments can assign a mobility state to the mobile device after the transition to the destination wireless access network, even though the mobile device is not assigned a mobility state in the source wireless access network. For example, the mapping 102 that is implemented as a function noted above can be used to assign the mobility state to the mobile device in the destination wireless access network, based on the input information 100. In such scenarios, the "mapping" would be between a non-existent mobility state (in the source wireless access network) to a mobility state of the destination wireless access network.

FIG. 2 is a block diagram of an example arrangement that includes several wireless access networks 202, 204, 206 according to corresponding different access technologies. The wireless access network 202 is an EUTRAN, the wireless access network 204 is a UTRAN, and the wireless access network 206 is a GERAN. In other examples, other or alternative types of wireless access networks can be present.

A mobile device 200 can move around and can transition among the different wireless access networks 202, 204, and 206. To support mobility state mapping as discussed above, mapping control elements can be included in one or more devices depicted in FIG. 2. For example, mobility state mapping can be performed by a mapping control element 208 in the mobile device 200. Alternatively, the mobility state mapping can be performed on the network side, in which case mapping control elements can be provided in various network nodes (discussed further below). As yet a further alternative, mobility state mapping can be performed based on cooperation between the mobile device 200 and corresponding network node(s).

As shown in FIG. 2, the EUTRAN 202 includes an eNode B 210 (although just one eNode B is shown, note that the EUTRAN 202 can include multiple eNode Bs). The EUTRAN 202 is part of an EUTRA (or LTE) mobile communications network 212, which further includes a serving gateway 214, a mobility management entity (MME) 216, and a packet data network (PDN) gateway 218. The MME 216 is a control node for the EUTRAN 202. For example, the MME 212 is responsible for idle mode mobile station tracking and paging procedures. The MME 212 is also responsible for choosing a serving gateway for a mobile device at initial connection and at time of handover or cell reselection. The MME 212 is also responsible for authenticating the user of a mobile device.

The serving gateway 214 routes bearer data packets. The serving gateway 214 also acts as a mobility anchor for the user plane during transitions between different wireless access networks. The serving gateway 214 is also connected to the PDN gateway 218 that provides connectivity between the mobile device 200 and a packet data network 220 (e.g., the Internet, a network that provides various service, etc.).

The UTRAN 204 includes a node B 222 and a radio network controller (RNC) 224. Note that the UTRAN 204 can include multiple node Bs and RNCs. The UTRAN 204 is part of a UMTS mobile communications network 226, which also includes core network node(s) 228 (connected to the packet data network 220). The core network node(s) 228 can be similar to the core network node(s) used in a GSM mobile communications network 230 (discussed below).

The GSM communications network 230 includes the GERAN 206, which has a base station 232 and a base station controller (BSC) 234 (a BSC has functionality similar to that of the RNC). Note that the GERAN 206 can include multiple base stations and BSCs. The BSC 234 is connected to an SGSN 236 (Serving GPRS Support Node), where "GPRS" stands for General Packet Radio Service. The SGSN 236 is responsible for routing of data packets from and to mobile devices, performing mobility management, performing logical link management, performing authentication, and so forth.

The SGSN 236 is connected to a GGSN 238 (Gateway GPRS Support Node), and is responsible for the interworking between the GSM network 230 and an external network such as the packet data network 220.

In the GSM mobile communications network 230, the SGSN 236 and GGSN 238 are considered core networks, which can be similar to the core network(s) 228 in the UMTS mobile communications network 226.

Note that in some alternative examples, some of the network nodes depicted in FIG. 2 can be combined.

As noted above, mobility state mapping according to some embodiments can be implemented on the network side, to perform mobility state mapping by the network or to perform mobility state mapping in cooperation with the mobile device 200. As depicted in examples according to FIG. 2, mobility control elements for such mobility state mapping can be provided in one or more of the following network nodes: mobility control element 240, 242, or 244 in the eNode B 210, serving gateway 214, or MME 216, respectively; mobility control element 246 or 248 in the RNC 224 or core network node 228, respectively; or mobility control element 250 or 252 in the RNC 234 or SGSN 236, respectively.

The mobility control elements implemented in the various nodes (including the mobile device 200 and the network nodes) can be implemented as machine-readable instructions executable on one or multiple processors. Alternatively, the mobility control elements can be hardware-based control elements.

FIG. 3 is a flow diagram of a process according to some implementations. The process of FIG. 3 can be performed by the mobile device 200 of FIG. 2, or by a network node (any of the various network nodes depicted in FIG. 2). The process performs (at 302) a procedure to transition a mobile device from a source wireless access network to a destination wireless access network.

In response to the transition, the process applies (at 304) the mapping 102 (FIG. 1) to obtain an output mobility state (104 in FIG. 1) of the mobile device 200 to use in the destination wireless access network, based on the input information (100 in FIG. 1) that is associated with mobility of the mobile device 200 in the source wireless access network. As explained above, the input information 100 can be a mobility state of the mobile device 200 while the mobile device 200 was connected to the source wireless access network. Alternatively, the input information 100 can be another type of indication of mobility, such as a cell change rate of the mobile device 200 or other indication of mobility.

The transition procedure (302) of FIG. 3 can be an idle mode cell reselection procedure, a connected mode cell reselection or change procedure, or a handover procedure. In idle mode, the mobile device 200 is camped at a particular cell. Camping at the particular cell refers to the mobile device 200 choosing the particular cell and monitoring for system information while in the particular cell. Note that the mobile device 200 while in idle mode is not allocated a dedicated channel. In response to a trigger (which can be an internal trigger of the mobile device 200 or a trigger based on information from the network, e.g. decreasing serving cell power or quality), the mobile device 200 performs a cell reselection evaluation process, to determine whether the mobile device should transition to another cell, based on predetermined criteria. Note that the reselected cell can be in the same wireless access network, or in a different wireless access network according to a different wireless access technology. If the cell reselection evaluation process determines that a new destination cell is to be selected, then a cell transition procedure is performed to transition the mobile device 200 from the source cell to the destination cell (note that the source and destination cells can be in the same wireless access network or different wireless access networks according to different access technologies).

When the mobile device 200 is in connected mode, the mobile device 200 may be allocated a dedicated channel (or multiple dedicated channels) to allow the mobile device 200 to communicate various information. When in connected mode, the mobile device 200 can perform cell reselection, similar to idle mode cell reselection. Alternatively, instead of performing cell reselection in connected mode (which is controlled by the mobile device 200), a network-controlled handover procedure can be performed, in which a network node sends a command to the mobile device 200 to cause handover of the mobile device 200 between different cells. In some cases, the handover can be between cells in wireless access networks of different access technologies (e.g. handover between UTRAN and EUTRAN, handover between GERAN and UTRAN or EUTRAN, etc.).

As noted above, the mapping 102 of FIG. 1 can be implemented as a mapping data structure to correlate a first collection of mobility states (for a first access technology) to a second collection of mobility states (for a second, different access technology). The following describes examples where it is assumed that the two different access technologies are for UTRAN and EUTRAN.

According to a first example solution, assuming that the mobile device has transitioned from a UTRAN to an EUTRAN, then the following mapping data structure can be used:

| UTRAN MOBILITY STATE (SOURCE) | EUTRAN MOBILITY STATE (DESTINATION) |
| --- | --- |
| NORMAL | NORMAL |
| HIGH | MEDIUM |

According to the foregoing mapping data structure, if the mobile device was in the "normal" mobility state in the UTRAN prior to the inter-access technology transition, then the mobile device would be assigned the "normal" mobility state in the EUTRAN after the inter-access technology transition. On the other hand, if the mobile device was in the "high" mobility state in the UTRAN prior to the inter-access technology transition, then the mobile device would be assigned the "medium" mobility state in the EUTRAN after the inter-access technology transition.

In the first example solution, if the mobile device has performed an inter-access technology transition from an EUTRAN to a UTRAN, then the following mapping data structure can be used:

| EUTRAN MOBILITY STATE (SOURCE) | UTRAN MOBILITY STATE (DESTINATION) |
| --- | --- |
| NORMAL | NORMAL |
| MEDIUM | HIGH |
| HIGH | HIGH |

According to the foregoing mapping data structure, if the mobile device was in the "normal" mobility state in the EUTRAN prior to the inter-access technology transition from the EUTRAN to the UTRAN, then the mobile device would be assigned the "normal" mobility state in the UTRAN after the inter-access technology transition. On the other hand, if the mobile device was in the "medium" mobility state in the EUTRAN prior to the inter-access technology transition, then the mobile device would be assigned the "high" mobility state in the UTRAN after the inter-access technology transition. If the mobile device was in the "high" mobility state in the EUTRAN prior to the inter-access technology transition, then the mobile device would be assigned the "high" mobility state in the UTRAN after the inter-access technology transition.

In alternative implementations, according to a second example solution, assuming that the mobile device has transitioned from a UTRAN to an EUTRAN, then the following mapping data structure can be used:

| UTRAN MOBILITY STATE (SOURCE) | EUTRAN MOBILITY STATE (DESTINATION) |
| --- | --- |
| NORMAL | NORMAL |
| HIGH | HIGH |

In the second example solution, if the mobile device has performed an inter-access technology transition from an EUTRAN to a UTRAN, then the following mapping data structure can be used:

| EUTRAN MOBILITY STATE (SOURCE) | UTRAN MOBILITY STATE (DESTINATION) |
| --- | --- |
| NORMAL | NORMAL |
| MEDIUM | NORMAL |
| HIGH | HIGH |

In yet further alternative implementations, according to a third example solution, assuming that the mobile device has transitioned from a UTRAN to an EUTRAN, then the following mapping data structure can be used:

| UTRAN MOBILITY STATE (SOURCE) | EUTRAN MOBILITY STATE (DESTINATION) |
| --- | --- |
| NORMAL | NORMAL |
| HIGH | HIGH |

In the third example solution, if the mobile device has performed an inter-access technology transition from an EUTRAN to a UTRAN, then the following mapping data structure can be used:

| EUTRAN MOBILITY STATE (SOURCE) | UTRAN MOBILITY STATE (DESTINATION) |
|---|---|
| NORMAL | NORMAL |
| MEDIUM | HIGH |
| HIGH | HIGH |

The foregoing are examples of static mappings that can be applied between mobility states of different access technologies when performing inter-access technology transitions—in other examples, other mappings can be applied.

The foregoing static mappings allow for selection of an appropriate mobility state for the mobile device after inter-access technology transfer, to achieve enhanced performance of the mobile device in the destination wireless access network. For example, one or more configuration parameters of the mobile device can be set to achieve such enhanced performance.

In implementations where mobility state determination is performed at the mobile device, the mapping 102 (FIG. 1) can be stored in the mobile device. This mapping 102 can be communicated to the mobile device during initialization of the mobile device upon mobile device startup or upon entry of the mobile device into a wireless access network.

In some implementations, a network node can report, using parameters, a particular mapping to use between a mobility state of the mobile device while the mobile device was in the source wireless access network, and a mobility state of the mobile device while the mobile device was in the destination wireless access network. The parameters can be sent in any of various messages, which can include messages sent individually to the mobile device, or system information messages that are broadcast to multiple mobile devices served by the network node.

As specific examples, parameters A and B can be used to communicate a mapping to use in an inter-access technology transition from a UTRAN to an EUTRAN. The parameter A can have the following values, which can indicate a corresponding mapping set forth below (the example assumes A is a two-bit value):

Parameter A:

| 00 | UTRAN high → EUTRAN high |
| 01 | UTRAN high → EUTRAN medium |
| 10 | UTRAN high → EUTRAN normal. |

In the foregoing, "high," "medium," and "normal" represent respective mobility states.

The parameter B can have the following values, which can indicate a corresponding mapping set forth below (the example assumes B is a two-bit value):

Parameter B:

| 00 | UTRAN normal → EUTRAN high |
| 01 | UTRAN normal → EUTRAN medium |
| 10 | UTRAN normal → EUTRAN normal. |

In these examples, parameters C, D, and E can be used to communicate a mapping to use in an inter-access technology transition from an EUTRAN to a UTRAN. The parameter C can have the following values, which can indicate a corresponding mapping set forth below (the example assumes C is a one-bit value):

Parameter C:

| 0 | EUTRAN high → UTRAN high |
| 1 | EUTRAN high → UTRAN normal. |

The parameter D can have the following values, which can indicate a corresponding mapping set forth below (the example assumes D is a one-bit value):

Parameter D:

| 0 | EUTRAN medium → UTRAN high |
| 1 | EUTRAN medium → UTRAN normal. |

The parameter E can have the following values, which can indicate a corresponding mapping set forth below (the example assumes E is a one-bit value):

Parameter E:

| 0 | EUTRAN normal → UTRAN high |
| 1 | EUTRAN normal → UTRAN normal. |

In other examples, other parameters, information elements, or messages can be used for communicating a mapping to use by the mobile device.

Figure 5:
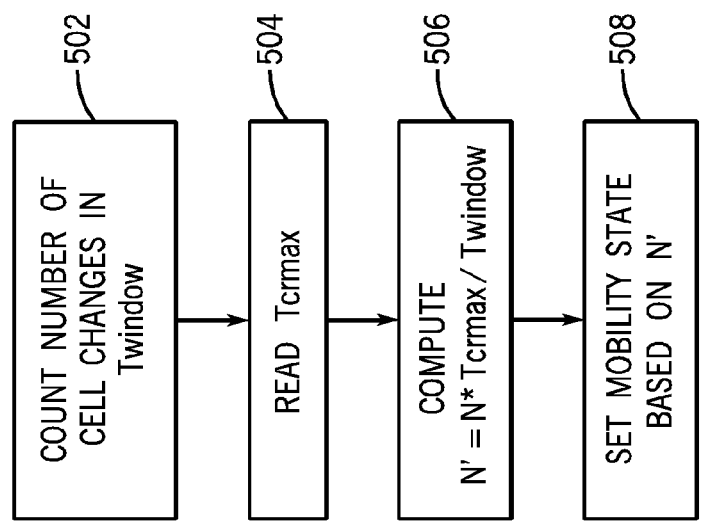

As discussed above, instead of using static mappings, dynamic mappings can be employed instead, based on use of a function that takes input information (100 in FIG. 1) and produces the output mobility state (104 in FIG. 1) to be used in the destination wireless access network. FIG. 5 illustrates an example process relating to use of such function. The tasks of FIG. 5 can be considered an implementation of task 304 in FIG. 3. Reference is made to both FIGS. 4 and 5 in the following discussion.

FIG. 4 shows that a mobile device, while in a source wireless access network, was in cells U1, U2, and U3—in other words, in the source wireless access network, the mobile device performed at least two transitions: from U1 to U2, and then from U2 to U3. At time 402, the mobile device performed an inter-access technology transition to a destination wireless access network. In the example of FIG. 4, the mobile device has transitioned to cell E1 in the destination wireless access network. At a later time, the mobile device transitions to cell E2 from E1 in the destination wireless access network. Although FIG. 4 shows cell transitions in the source wireless access network, there can be a scenario where the mobile device was in the source wireless access network for a relatively short period of time—in such scenario, the cell changes among cells U1, U2, and U3 may have occurred partly in the source wireless access network and partly in a third wireless access network that the mobile device was in prior to source wireless access network. In this scenario, the U1 to U2 transition may have occurred in the third wireless access network, while the U2 to U3 transition may have occurred between the third wireless access network and the source wireless access network.

As shown in FIG. 5, in response to the inter-access technology transition (at time 402) of the mobile device, the process of FIG. 5 counts (at 502) a number (N) of cell changes in a predefined time window (Twindow). The number (N) of cell changes may have occurred in the source wireless access network or in the source wireless access network and another wireless access network. Note that in further implementations, cell changes can also be counted in the context of soft handovers. Soft handovers can involve changing active sets of cells, where an active set includes one or more cells that a mobile device is connected to. In the source wireless access network, soft handovers can thus involve changing the active set from {U1} to {U1, U2}, to {U1, U2, U3}, and to {U1, U3}. The counting performed at 502 can involve counting such changes in active sets. Next, the process reads (at 504) a value of Tcrmax for the destination wireless access network. The parameter Tcrmax represents a predefined time interval to be used in the destination wireless access network for counting a number of cell changes for purposes of classifying the mobility state of the mobile device. Note that Twindow and Tcrmax can be different values.

The parameter Twindow can be based on one or more of the following values: a Tcrmax value of the destination wireless access network (if multiple Tcrmax values are specified in the destination wireless access network, then the maximum Tcrmax value can be used in some examples); a fixed time window value; or a value derived from cells in the source wireless access network (such as a Tcrmax value used in cells of the source wireless access network).

The value N counted at 502 can be considered to be part of the input information 100 of FIG. 1—the value N is related to the mobility of the mobile device in the source wireless access network.

The process of FIG. 5 next computes (at 506) an adjusted count value, N', as follows:

$$N'=N*Tcrmax/Twindow.$$

Effectively, N' is equal to the value of N, scaled by the ratio Tcrmax/Twindow, where Tcrmax is the value read at 504. The process then sets (at 508) the mobility state of the mobile device in the destination wireless access network based on comparing N' to a predefined threshold (or predefined thresholds). Note that the predefined threshold can be a threshold stored in the mobile device, or alternatively, a threshold received from the network. In some examples, for a UTRAN, the mobility state can be set to "normal" or "high" depending on a comparison of N' to a threshold, while for an EUTRAN, the mobility state can be set to "normal," "medium," or "high" depending on a comparison of N' to respective thresholds.

The tasks 506 and 508 in FIG. 5 constitute the function that is applied based on the input information (N) to produce an output mobility state.

In some implementations, the process of FIG. 5 can be performed at the mobile device.

Figure 6:
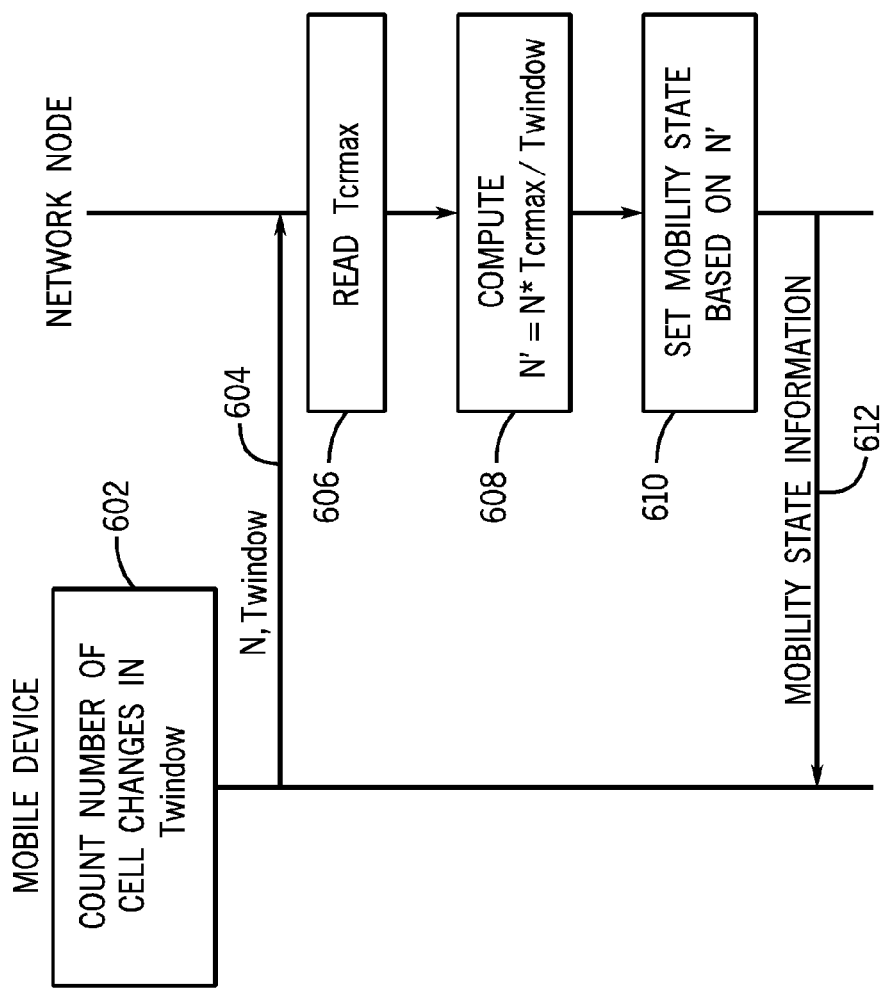
FIGS. 5 and 6 are flow diagrams of performing dynamic mapping to obtain a mobility state of a mobile device, according to alternative implementations.

Alternatively, a process similar to FIG. 5 can be performed at a network node, such as one of the network nodes depicted in FIG. 2. FIG. 6 is a message flow diagram showing tasks of a mobile device and the network node. In response to the inter-access technology transition of the mobile device (at time 402), the mobile device counts (at 602) a number (N) of cell changes in the predefined time window (Twindow). In other implementations, instead of performing the counting (602) at the mobile device, the counting of N can instead be performed at the network node. Next, the mobile device sends (at 604) the N and Twindow values to the network node. These values can be communicated in information elements of one or more messages from the mobile device to the network node, such as an RRConnectionRequest message or a HANDOVER TO UTRAN COMPLETE message. The RRConnectionRequest message is sent by the mobile device to initiate a call. The HANDOVER TO UTRAN COMPLETE message is sent by the mobile device to indicate completion of handover to a destination wireless access network (in this example a UTRAN). In other examples, the N and Twindow values can be sent in other messages from the mobile device to the network. Note that the arrow 604 (as well as 612) in FIG. 6 can represent one or multiple messages.

After or before receipt of the N and Twindow values, the network node reads (at 606) a value of Tcrmax for the destination wireless access network. The network node next computes (at 608) an adjusted count value, N', as follows:

$$N'=N*Tcrmax/Twindow.$$

The network node then sets (at 610) the mobility state of the mobile device in the destination wireless access network based on comparing N' to a predefined threshold (or predefined thresholds). The network node then sends (at 612) information indicating the determined mobility state to the mobile device. The mobility state can be sent in a connected mode message from the network node to the mobile device.

The ability to perform dynamic mapping as discussed above allows for a system to address various issues, in some examples. First, appropriate selection of a mobility state of a mobile device can be accomplished, in situations where the mobile device performs an inter-access technology transition between source and destination wireless access networks that have respective collections of mobility states, where the collections can be different.

Another issue that can be addressed using dynamic mapping according to some implementations is to allow for selection of a mobility state of a mobile device in the situation where the source wireless access network (e.g. a GERAN) does not define mobility states. In such scenarios, once the mobile device enters the destination wireless access network, the dynamic mapping can be applied to select a mobility state to use given the current mobility of the mobile device—for example, a mobile device that has experienced a relatively high cell change rate is assigned a "high" mobility state, whereas a mobile device that has experienced a relatively low cell change rate is assigned a "normal" mobility state.

In this way, the mobile device does not have to experience sub-optimal performance (for some period of time until the mobile device is properly classified in the correct mobility state) that can be associated with selection of an incorrect mobility state for the mobile device once the mobile device enters the destination wireless access network.

FIGS. 7 and 8 depict various example message flow diagrams that illustrate a capability to communicate mobility state information between various devices. In conventional mechanisms, passing of mobility state information between source and destination wireless access networks (e.g. UTRAN and EUTRAN) during an inter-access technology transition may not exist. According to current 3GPP standards for EUTRAN, mobility state detection is performed at the mobile device. On the other hand, according to current 3GPP standards, for UTRAN, idle mode mobility state detection is performed by the mobile device, while connected mode mobility state detection is not defined by the standards and may be performed by the network. As a result, it may be beneficial to define a way to pass mobility state information between wireless access networks of different access technologies for the following connected mode transition scenarios (although transitions between UTRAN and EUTRAN are listed below, similar techniques can be applied to other inter-access technology transitions):

UTRAN (network-based mobility detection) EUTRAN (mobile device-based mobility detection); or EUTRAN (mobile device-based mobility detection) UTRAN (network-based mobility detection).

FIG. 7 shows an example flow for a handover from a UTRAN to an EUTRAN. To initiate the handover, a UTRAN network node, such as the RNC 246 of FIG. 2, sends (at 702)

a HANDOVER FROM UTRAN command message to the mobile device, which may have been triggered based on a detection that the handover should be performed. Although reference is made to a specific message in FIG. 7, note that in alternative examples, other messages can be used. In accordance with some implementations, the HANDOVER FROM UTRAN command message (or other message in other examples) is configured to provide an information element to carry the mobility state information. The mobility state information identifies the mobility state of the mobile device while in the source wireless access network (which in this example is the UTRAN).

In response to the HANDOVER FROM UTRAN command message, the mobile device performs (at 704) a handover procedure from the UTRAN to the EUTRAN. As noted above, in the EUTRAN, mobility state detection when the mobile device is in connected mode is performed at the mobile device. By passing the mobility state information from the UTRAN to the mobile device in the HANDOVER FROM UTRAN command message, the mobile device can use the mobility state information to select an appropriate mobility state to use in the EUTRAN, using the mapping 102 (FIG. 1) as discussed above.

FIG. 8 shows an example flow for a handover from an EUTRAN to a UTRAN. To initiate the handover, a network node (such as an EUTRAN node, e.g. eNodeB 210 of FIG. 2), sends (at 802) a HANDOVER TO UTRAN command message to the mobile device, which may have been triggered based on a detection that the handover should be performed (where such detection may be performed at the source wireless access network, which in this example is the EUTRAN). Although reference is made to a specific message in FIG. 8, note that in alternative examples, other messages can be used.

In response to the HANDOVER TO UTRAN command message, the mobile device performs (at 804) a handover procedure to from the EUTRAN to the UTRAN. Upon successful completion of the handover procedure, the mobile device sends (at 806) a HANDOVER TO UTRAN COMPLETE message. In accordance with some implementations, the HANDOVER TO UTRAN COMPLETE message (or other message in other examples) is configured to provide an information element to carry the mobility state information. The mobility state information identifies the mobility state of the mobile device while in the EUTRAN. Since the destination access network, the UTRAN in this example, can perform connected mode mobility state detection on the network side, the communication of the mobility state information of the mobile device (mobility state in the EUTRAN) to the UTRAN network node allows the UTRAN network node to perform connected mode mobility state detection, based on application of the mapping 102 as discussed above.

In other examples, when performing a transition from a source wireless access network to a destination wireless access network, the mobility state of the mobile device can be passed from the source wireless access network to the mobile device (such as by using a HANDOVER message similar to that depicted in FIG. 7), followed by passing the mobility state from the mobile device to the destination wireless access network (such as by using a HANDOVER COMPLETE message similar to that depicted in FIG. 8).

Figure 9:
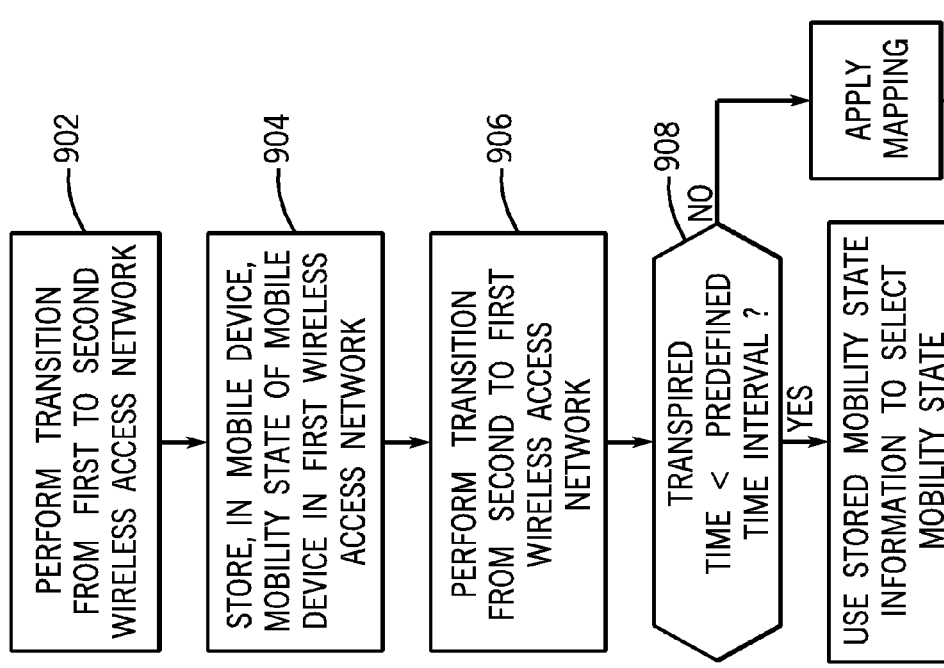
FIG. 9 is a flow diagram of a process performed in response to a round-trip succession of transitions, in accordance with some implementations.

FIG. 9 is a flow diagram of a process according to some implementations for addressing an issue relating to relatively quick successive inter-access technology transitions of a mobile device from a first wireless access network to a second wireless access network and then back to the first wireless access network, all within some predefined time interval (e.g. an interval represented by Tcrmax as discussed above). The round-trip succession of inter-access technology transitions each would involve mapping between different collections of mobility states; the result of such successive mappings may cause the selection of a mobility state when the mobile device returns to the first wireless access network (after the round-trip succession of inter-access technology transitions) to be different from the initial mobility state when the mobile device first transitioned out of the first mobility state. Such a result may be undesirable in some cases, since the mobility state of the mobile device in the first wireless access network has effectively changed even though a time interval corresponding to Tcrmax has not yet expired.

In accordance with some implementations, information relating to the mobility state of the mobile device when the mobile device transitions out of the first wireless access network can be stored (either at the mobile device or at the network side)—this stored mobility state can then be used to set the mobility state of the mobile device should the mobile device return to the first wireless access network within the predefined time interval.

In the ensuing discussion relating to FIG. 9, it is assumed that the process of FIG. 9 is performed by the mobile device—in other examples, the process of FIG. 9 can instead be performed by a network node. The mobile device performs (at 902) a transition from the first wireless access network to the second wireless access network. In response to such transition, the mobile device stores (at 904) information relating to the mobility state of the mobile device in the first wireless access network. The mobile device can store such information in a storage medium of the mobile device.

The mobile device then performs (at 906) a transition from the second wireless access network back to the first wireless access network. In response to this second transition, the mobile device determines (at 908) if the transpired time (time from the start of the first transition, 902, to the end of the second transition, 906) is less than the predefined time interval (e.g. Tcrmax). If not, then the mobile device applies (at 910) the mapping 102 (FIG. 1) as discussed above to select the appropriate mobility state in the first wireless access network.

However, if the transpired time is less than the predefined time interval, then the mobile device uses (at 912) the stored mobility state information to select the mobility state of the mobile device in the first wireless access network. In some implementations, the mobile device can simply set the mobility state of the mobile device to the mobility state represented by the stored mobility state information. Alternatively, the mobile device can map the mobility state represented by the stored mobility state information to a different mobility state to use, such as according to the following example:

| EUTRAN high | → | EUTRAN medium; or |
|---|---|---|
| EUTRAN medium | → | EUTRAN normal; or |
| EUTRAN medium | → | EUTRAN high. |

Although FIG. 9 shows the process being performed at the mobile device, note that the FIG. 9 process can alternatively be performed by a network node in the first wireless access network.

Also, although FIG. 9 refers to a succession of inter-access technology transitions A-B-A, the FIG. 9 flow can alternatively be applied to a succession of inter-access technology transitions A-B-C-A (where "A," "B," and "C" represent respective different types of access technologies).

Figure 10:
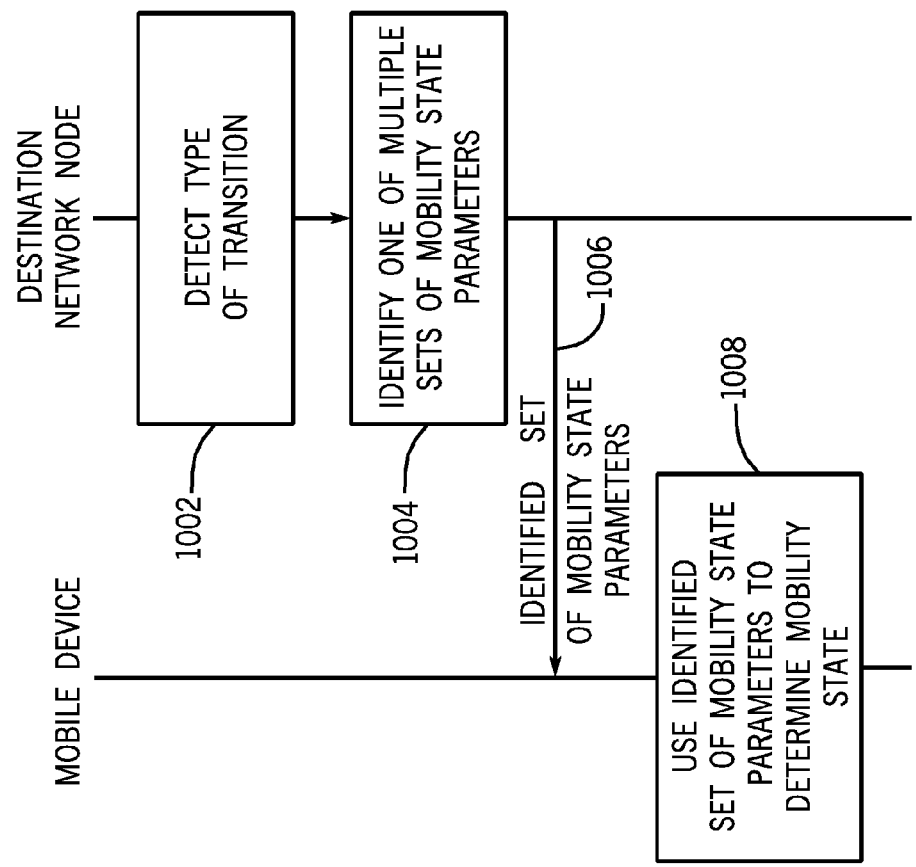
FIG. 10 is a flow diagram of a process of identifying a set of mobility state parameters to use for mobility state determination, in accordance with further implementations.

FIG. 10 is a flow diagram of a process for performing mobility state determination after a transition between cells, using an identified set of mobility state parameters that is optimized (or otherwise enhanced) for the specific type of transition (e.g. intra-access technology transition, EUTRAN to UTRAN, GERAN to UTRAN, etc.).

As discussed above, examples of mobility state parameters used to determine a mobility state of a mobile device include Ncr and Tcrmax. The number of cell changes within the predefined time interval (Tcrmax) is represented as Ncr. The number of cell changes can include cell reselections or handovers, whether within the same access technology or between different access technologies. In the UTRAN case, if Ncr exceeds a predetermined threshold, then the mobility state of the mobile device is set as a "high" mobility state; otherwise, the mobility state is set as a "normal" mobility state. In the EUTRAN case, there can be multiple thresholds to allow setting of the mobility state to "high," "medium," or "normal."

Different wireless access networks according to different access technologies can be associated with different cell sizes. Different cell sizes are associated with different coverage of wireless signaling, and thus the values of Ncr and Tcrmax may be set differently according to different cell sizes. In a specific wireless access network (e.g. UTRAN), if the same set of mobility state parameters (e.g. Ncr and Tcrmax) is used for mobility state determination irrespective of whether the mobile device has performed an intra-access technology transition (transition within the same UTRAN), an inter-access technology transition from an EUTRAN to the UTRAN, or an inter-access technology transition from a GERAN to the UTRAN, then sub-optimal mobility state selection can result.

As shown in FIG. 10, in response to a transition, a destination network node (the network node in the destination wireless access network) detects (at 1002) the type of transition between cells that has occurred. The transition types can include the following, as examples: intra-access technology transition, inter-access technology transition from access technology B to access technology A, inter-access technology transition from access technology C to access technology A, and so forth. Multiple different sets of the mobility state parameters can be provided for the respective different transition types.

Based on the detected transition type, the destination network node identifies (at 1004) one of the multiple sets of mobility state parameters. The identified set of mobility state parameters is sent (at 1006) by the destination network node to the mobile device. The mobile device then uses (at 1008) the received set of mobility state parameters to perform mobility state information.

In alternative implementations, where mobility state determination is performed on the network side rather than at the mobile device, the identified set of mobility state parameters does not have to be sent to the mobile device. Instead, the destination network node can use the identified set of mobility state parameters to perform mobility state determination for the mobile device.

In yet further alternative implementations, tasks 1002 and 1004 can be performed at the mobile device instead of at the destination network node.

Note that the process of FIG. 10 can be performed by itself or in combination with the process of FIG. 5 or 6 relating to use of a dynamic mapping function to address the issue of different cell sizes for different types of transitions.

Figure 11:
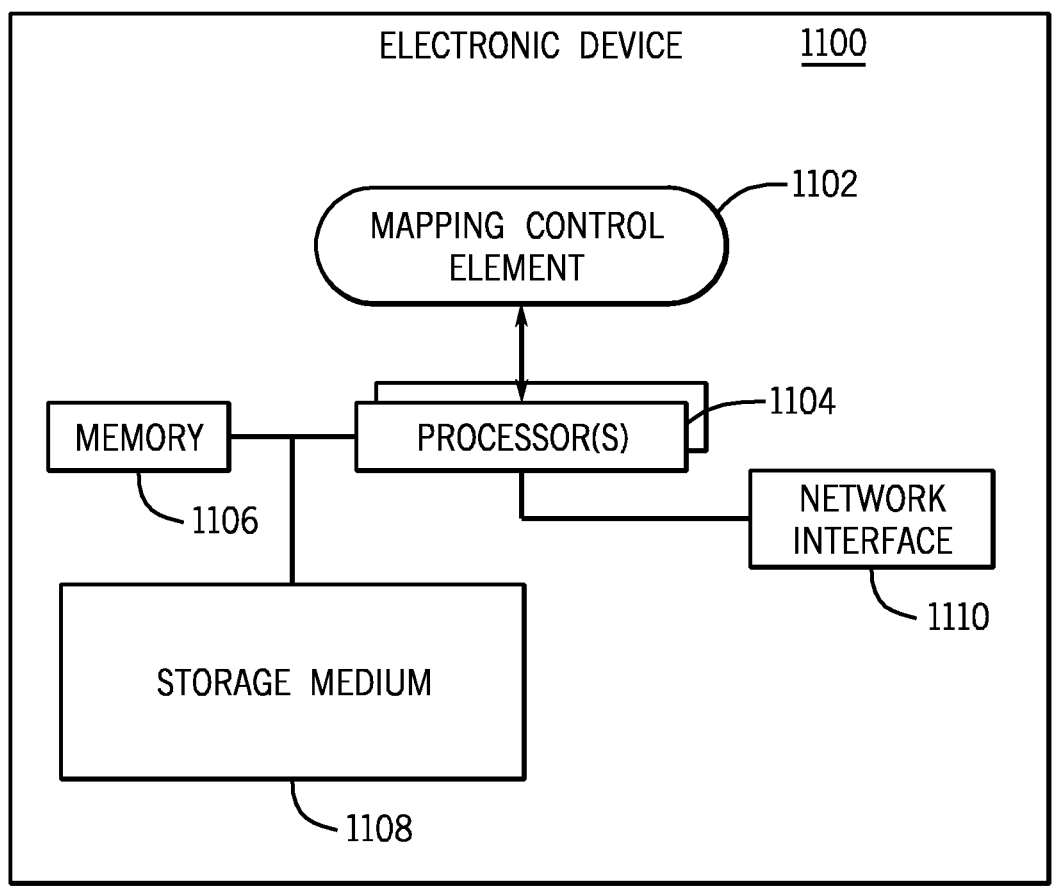
FIG. 11 is a block diagram of an electronic device according to some examples.

Using various techniques as discussed above, selection of a mobility state for a mobile device after an inter-access technology that is more consistent with the actual mobility of the mobile device can be accomplished. For example, a relatively fast-moving mobile device (identified as a mobile device with a "high" mobility state) can be biased towards larger cells in an arrangement that implements a hierarchical cell structure, such that excessive transitions between cells does not occur, where excessive transitions can result in increased power consumption at the mobile device and an increase in network traffic. As another example, a relatively slow-moving mobile device (identified as a mobile device with a "normal" mobility state) can be biased towards smaller cells in an arrangement that implements a hierarchical cell structure, such that improved signaling characteristics of smaller cells can be used for such a relatively slow-moving mobile device FIG. 11 is a block diagram of an example electronic device 1100, which can be the mobile device 200 or any of the network nodes of FIG. 2. The electronic device 1100 includes a mapping control element 1102 for performing various tasks as discussed above. In implementations where the mapping control element 1102 is implemented as machine-readable instructions, the mapping control element 1102 is executable on one or multiple processors 1104, which can be connected to a memory 1106, a persistent storage medium 1108, and a network interface 1110 (to communicate over a wired or wireless network). A processor can include a microprocessor, microcontroller, processor module or subsystem, programmable integrated circuit, programmable gate array, or another control or computing device.

The storage medium 1108 or memory 1106 (or both) can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   performing a procedure to transition a mobile device from a first wireless access network to a second wireless access network; and
   in response to the transition, applying a mapping to obtain a particular mobility state of the mobile device to use in the second wireless access network, wherein the mapping outputs the particular mobility state to use in the second wireless access network in response to information associated with mobility of the mobile device in the first wireless access network, the mapping correlating a first collection of mobility states for a first access technology of the first wireless access network to a second collection of mobility states for a second, different access technology of the second wireless access network.

2. The method of claim 1, wherein applying the mapping comprises accessing a mapping data structure that correlates the first collection of mobility states for the first access technology of the first wireless access network to the second, different collection of mobility states for the second, different access technology of the second wireless access network.

3. The method of claim 2, wherein the mapping data structure has a plurality of entries, wherein each of the plurality of entries correlates a corresponding mobility state of the first collection to a corresponding mobility state of the second collection.

4. The method of claim 1, wherein the first collection of mobility states is for a Universal Terrestrial Radio Access Network (UTRAN), and the second, different collection of mobility states is for an Evolved UTRAN.

5. The method of claim 1, wherein the first collection of mobility states is for an Evolved Universal Terrestrial Radio Access Network (EUTRAN), and the second, different collection of mobility states is for a UTRAN.

6. The method of claim 1, wherein applying the mapping comprises applying a function that produces the particular mobility state in response to the information associated with mobility of the mobile device in the first wireless access network.

7. The method of claim 6, wherein the function produces the particular mobility state in response to information indicating a cell change rate of the mobile device in at least the first wireless access network.

8. The method of claim 7, wherein the cell change rate of the mobile device in the first wireless access network is based on a number of transitions among cells performed by the mobile device in at least the first wireless access network in a predefined time window.

9. The method of claim 8, wherein the cell change rate of the mobile device is further based on a predetermined time interval used for defining a mobility state of the mobile device in the second wireless access network.

10. The method of claim 1, wherein the performing and applying are performed at a network node including a processor, the method further comprising:
receiving, at the network node from the mobile device, the information associated with mobility of the mobile device in the first wireless access network.

11. The method of claim 1, further comprising:
storing, in the mobile device, information relating to a mobility state of the mobile device in the first wireless access network prior to transitioning the mobile device from the first wireless access network to the second wireless access network; and
using the stored information to obtain a mobility state for the mobile device when the mobile device transitions back to the first wireless access network.

12. The method of claim 1, wherein the performing and applying are performed at the mobile device, the method further comprising:
receiving, at the mobile device, information relating to the mapping from a network node of the second wireless access network.

13. A method comprising:
receiving, by a first device from a second device, information relating to a mobility state of a mobile device, wherein the mobility state is based on mobility of the mobile device in a first wireless access network, the information relating to the mobility state received in a handover message relating to handing over the mobile device from the first wireless access network to a second wireless access network,
wherein the first device is one of the mobile device and a network node in communication with the mobile device, and the second device is the other of the mobile device and the network node; and
applying, by the first device, a mapping to determine a mobility state of the mobile device to use in the second wireless access network, based on the received information relating to the mobility state of the mobile device in the first wireless access network, the mapping correlating a first collection of mobility states for a first access technology of the first wireless access network to a second collection of mobility states for a second, different access technology of the second wireless access network.

14. The method of claim 13, wherein the mobility state is based on a rate of transitioning between cells by the mobile device.

15. The method of claim 13, wherein the mobility state is based on a velocity of the mobile device.

16. The method of claim 13, wherein the handover message includes one of a HANDOVER FROM UTRAN command message and a HANDOVER TO UTRAN COMPLETE message.

17. A system comprising:
an interface to communicate over a network; and
at least one processor configured to:
detect a type of transition by a mobile device between cells; and
identify a set of mobility state parameters from a plurality of sets of mobility state parameters based on the detected type of transition, wherein the identified set of mobility state parameters is useable to determine a mobility state of the mobile device after the transition, the identifying comprising:
identifying a first set of the plurality of sets of mobility state parameters based on detecting an intra-access technology transition between cells of a same access technology; and
identifying a second, different set of the plurality of sets of mobility state parameters based on detecting an inter-access technology transition between cells of different access technologies.

18. The system of claim 17, wherein detecting the type of transition comprises detecting the inter-access technology transition between a first wireless access network according to a first access technology, and a second wireless access network according to a second, different access technology.

19. The system of claim 17, wherein the identified set of mobility parameters includes a number parameter and a time interval parameter, wherein the number parameter represents a number of cell changes, and the time interval parameter represents a predefined time interval during which the number of cell changes is counted.

20. The system of claim 17, wherein the system is one of the mobile device and a network node.

21. A system comprising:
an interface to communicate over a network; and
at least one processor configured to:

perform a procedure to transition a mobile device from a first wireless access network to a second wireless access network; and in response to the transition, apply a mapping to obtain a particular mobility state of the mobile device to use in the second wireless access network, wherein the mapping outputs the particular mobility state to use in the second wireless access network in response to information associated with mobility of the mobile device in the first wireless access network, the mapping correlating a first collection of mobility states for a first access technology of the first wireless access network to a second collection of mobility states for a second, different access technology of the second wireless access network.

22. The system of claim 21, wherein the system is one of the mobile device and a network node.

\* \* \* \* \*